United States Patent
Mirell et al.

(10) Patent No.: US 6,804,470 B1
(45) Date of Patent: *Oct. 12, 2004

(54) ENERGY-DEPLETED RADIATION APPARATUS AND METHOD

(76) Inventors: Stuart Gary Mirell, 3018 Haddington Dr., Los Angeles, CA (US) 90064; Daniel Joseph Mirell, 3018 Haddington Dr., Los Angeles, CA (US) 90064

( * ) Notice: Subject to any disclaimer, the term of this patent is extended or adjusted under 35 U.S.C. 154(b) by 0 days.

This patent is subject to a terminal disclaimer.

(21) Appl. No.: 09/510,649

(22) Filed: Feb. 22, 2000

Related U.S. Application Data

(63) Continuation of application No. 08/811,382, filed on Mar. 4, 1997, now Pat. No. 6,028,686.

(51) Int. Cl.[7] .............................................. H04B 10/04
(52) U.S. Cl. ..................... 398/182; 398/201; 356/450
(58) Field of Search ............................... 359/10, 11, 30, 359/154, 160, 109, 188, 174–179, 180–181, 189, 193, 194, 550–560; 356/450; 360/112; 365/112; 398/130, 182, 183, 201, 212

(56) References Cited

U.S. PATENT DOCUMENTS

| | | | | |
|---|---|---|---|---|
| 3,734,592 A | * | 5/1973 | Sztankay et al. | 359/736 |
| 3,756,691 A | * | 9/1973 | Pasold | 359/499 |
| 3,779,631 A | * | 12/1973 | Shupe | 359/342 |
| 4,068,952 A | * | 1/1978 | Erbert et al. | 356/4.02 |
| 4,473,270 A | * | 9/1984 | Shaw | 385/30 |
| 4,585,948 A | * | 4/1986 | Schneider et al. | 250/208.1 |
| 4,722,604 A | * | 2/1988 | French et al. | 356/450 |
| 4,968,107 A | * | 11/1990 | Yeh | 359/7 |
| 5,006,813 A | * | 4/1991 | Khoshnevisan et al. | 359/326 |
| 5,093,802 A | * | 3/1992 | Hait | 708/801 |
| 5,301,054 A | * | 4/1994 | Huber et al. | 359/132 |
| 5,373,383 A | * | 12/1994 | LaGasse | 359/124 |
| 5,568,301 A | * | 10/1996 | Tiemann et al. | 359/140 |
| 5,680,210 A | * | 10/1997 | Swanson | 356/450 |
| 5,698,344 A | * | 12/1997 | Bai et al. | 430/1 |
| 6,028,686 A | * | 2/2000 | Mirell et al. | 359/154 |

FOREIGN PATENT DOCUMENTS

| EP | 0335486 | * 10/1998 |
|---|---|---|
| JP | 04230740 | * 8/1992 |

* cited by examiner

*Primary Examiner*—Leslie Pascal
(74) *Attorney, Agent, or Firm*—Noel F. Heal

(57) ABSTRACT

A generator of energy-depleted radiation and various methods and applications using the energy-depleted radiation. Various embodiments are disclosed of the energy-depleted radiation generator and an energy-restored radiation generator, which permits detection of wave properties of the radiation without regard to the depletion of its energy. The energy-depleted radiation generator functions in one embodiment by selective transmission of destructively interfering radiation. Other embodiments use two-beam coupling or directional coupling to achieve energy depletion. Restoring energy to an energy-depleted radiation beam is accomplished by transferring energy to it from a reference beam, in a beam-to-beam transfer or in an optical amplifier. The invention has important applications in fields such as communications, specimen analysis, photorefractive recording, holography, and other fields in which the reduction of energy content in the associated radiation is advantageous.

10 Claims, 7 Drawing Sheets

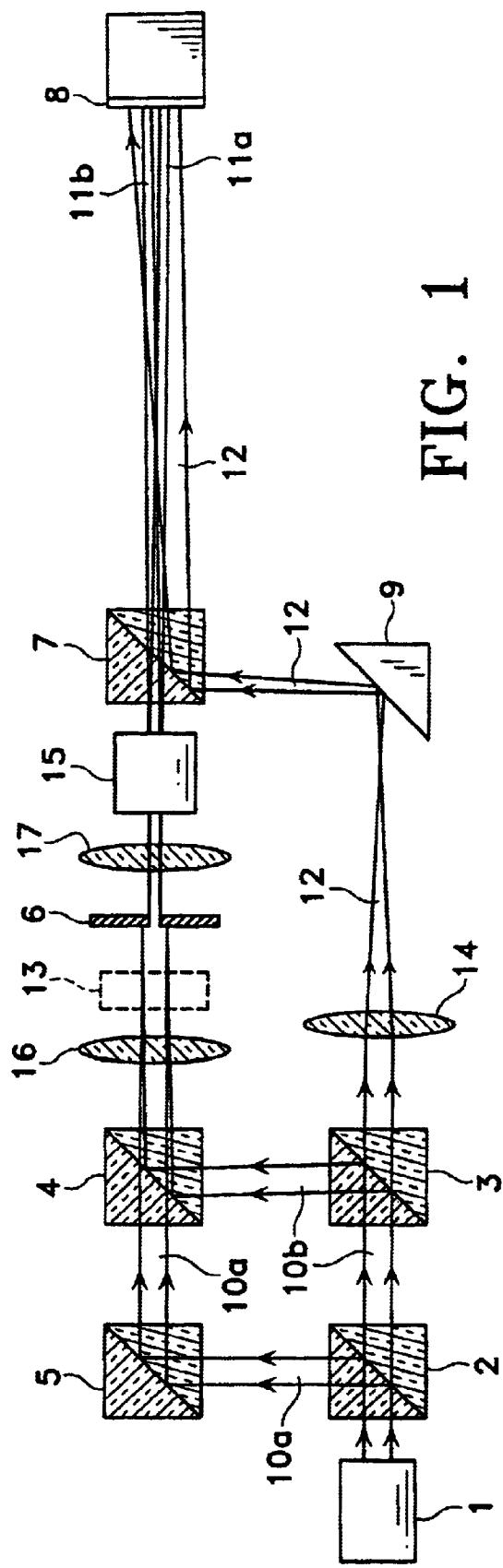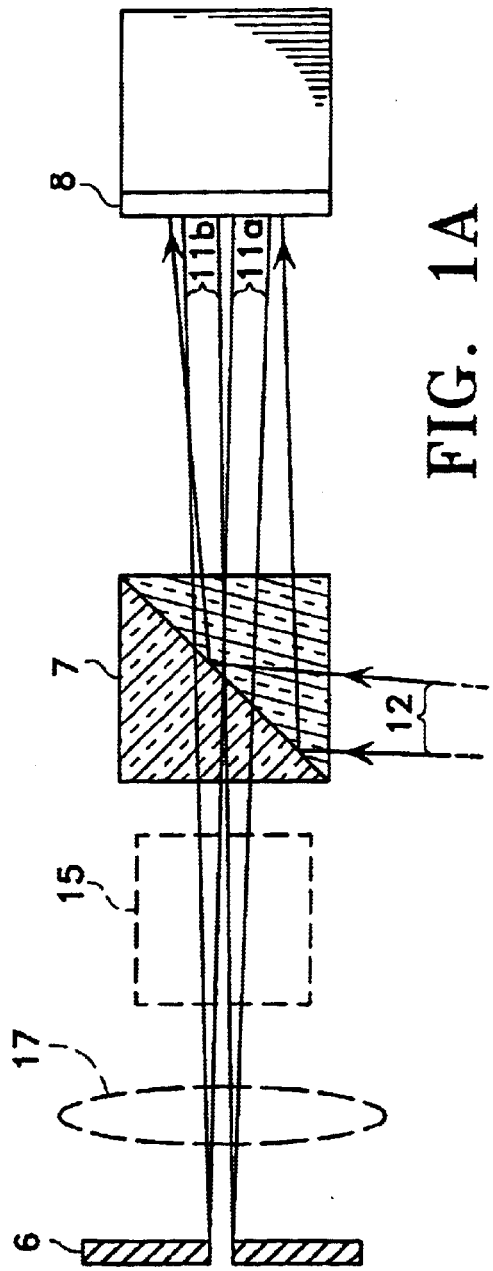
FIG. 1
FIG. 1A

ENERGY-DEPLETED RADIATION APPARATUS AND METHOD

CROSS-REFERENCE TO RELATED APPLICATION

This is a continuation of application Ser. No. 08/811,382, filed Mar. 4, 1997, now U.S. Pat. No. 6,028,686, issued Feb. 22, 2000, having the same title and inventors as the present invention.

BACKGROUND OF THE INVENTION

This invention relates generally to signal propagation systems and, more particularly, to such systems in which a signal in the form of radiation, such as electromagnetic radiation, is propagated through a medium or through space, usually between a transmitter and a receiver. It should not be inferred, however, that the invention pertains only to communication systems. As will become apparent from this specification, the invention also has application to other signal propagation systems, such as the use of electromagnetic or particle radiation in the analysis of specimen structure.

In many situations in which an electromagnetic radiation signal is transmitted through a medium (including a vacuum), a relatively high level of energy is used to transmit the radiation signal. Moreover, it is almost uniformly accepted that high energy levels are needed for propagation of the radiation signal. Yet there are many applications in which it would be advantageous to reduce the transmitted energy level. Prior to the present invention, no one has been able suggest how this goal might be accomplished.

A notable example of an application appropriate to the invention is the transmission of data such as text, video, or audio, using electromagnetic radiation. With the prodigious volume of such information now being transmitted over ground-based transmitters and receivers and over satellite links, a substantial reduction in energy usage would be highly desirable. This reduction would be particularly advantageous when applied to a transmitter at a remote site, such as on a satellite, for which electrical power is severely limited. In other situations, it would be equally advantageous to provide a substantially increased signal range for a given power consumption.

Another class of applications relevant to this invention concerns the use of electromagnetic or particle radiation in the analysis of specimen structure. Such applications known in the art are inclusive of virtually the entire electromagnetic spectrum from radio waves through x-rays and of a wide variety of specimens. A specific example is the inspection of manufactured semiconductor structure. It would be desirable to accomplish this task with x-ray inspection beams having an ultra-low energy content instead of the relatively high energy content that must presently be employed.

In one class of radiography applications, the specimen to be analyzed is subject to damage from energy deposited by an incident radiation beam. A goal that has eluded researchers in this area is to make use of physical properties of a specimen, such as refraction, reflection, or phase shifting, to analyze the specimen without concurrent energy deposition. The ultimate goal in specimen analysis is three-dimensional reconstruction of a specimen image without the use of energy in the incident beam.

It will be appreciated from the foregoing that there are variety of applications using radiation signal propagation for which it would be highly desirable to employ radiation of significantly reduced energy content, without commensurately reducing the detectability of information carried on the signal being propagated. The present invention, as will now be described, accomplishes this goal in an elegant, completely novel and, perhaps, revolutionary manner.

SUMMARY OF THE INVENTION

The principal object of this invention is to transmit and receive a radiation signal such as a radio wave in such a way as to significantly reduce the energy content of the signal, but without commensurately reducing the detectability of information carried on the signal. As will become apparent as the description proceeds, the nature of this invention is such that it may provide an important resolution of conflicting fundamental physical theories concerning the nature of electromagnetic radiation. Although this aspect of the invention disclosure may raise interesting, and even controversial, theoretical concerns, it is believed that the detailed structure of the present invention, and verification of its functionality, can be described independently of such theoretical concerns.

The multiplicity of operational uses for the invention yield several distinct but closely related systems. These various operational uses are in fields of application in which the normal energy content of an electromagnetic or particle radiation beam is inherently disadvantageous, or where totally new applications are made possible with significantly reduced beam energy.

The present invention relates to an energy-depleted radiation transmitter and receiver. While it is expedient to summarize the invention in terms appropriate to optical wavelengths, it will be appreciated that the invention is applicable over a wide range of the electromagnetic spectrum, and is equally applicable to particle radiation systems.

For the transmitter, in one of its simplest embodiments, two well-collimated coherent beams, as from a laser with a split beam, are caused to intersect with a small but finite relative angulation along nearly coincident trajectories. At the region of maximum intersection, an interference pattern is formed. This pattern may be a sequence of bright and dark bands. The origin of these bands resides with a lateral migration of energy flux within the intersecting beams toward regions where there is constructive interference and away from regions where there is destructive interference.

In the extreme for two interfering beams, the central region of a bright band may have a nearly doubled energy flux: compared to the average energy flux of the intersecting beams whereas the central region of a dark band potentially may have a nearly zero energy flux. As will soon become clear, the transmitter of the invention propagates radiation from at least one of these dark bands of depleted energy.

Because the invention is functional, it may be inferred that the dark band, although clearly energy depleted, nevertheless still has a wave-like attribute that can carry information, which is the essence of the present invention. The existence of this wave-like attribute may be demonstrated by a simple experiment, which is described in the following paragraphs.

A slit aperture, inserted into the beam path at the location of the interference pattern, initially is aligned with a bright band. The slit should be sufficiently narrow to pass only the central part of a bright band but not so narrow as to produce the Frauenhoffer condition for diffraction. With these restrictions on the slit and appropriate use of lenses in the beam path, the transmitted bright band readily is split into two distinct beams at a selected point sufficiently distant from the slit. This separation is feasible because the transmitted band is a composition of parts of the angularly converging slit-incident beams.

A simple photodetector receiver, situated at the selected distant point, readily measures the energy from the two beam spots on its photon-sensitive surface. The two beam spots appear as a pair of parallel elongated ovals approximately slit-shaped, as expected. The slit is then realigned to a dark band. The slit now appears to transmit nothing and this is apparently supported by an essentially zero reading of the photodetector receiver. Nevertheless, the apparatus is now in a configuration critical to the operation of this invention.

A third beam is split off of the initial coherent beam. Unlike the first two beams, which converged on the slit, the third beam is transmitted directly to the photodetector. The beam spot of the third beam encompasses the entire area where the previous two bright band elongated oval beam spots had been located. The expected energy of the third beam is, of course, measured by the photodetector, but an additional and remarkable phenomenon may be observed at the photodetector. The beam spot of the third beam on the photodetector surface now exhibits two parallel elongated oval interference patterns. Furthermore, these interference patterns are not brighter on average than the rest of the third beam spot, and these patterns disappear when the slit is blocked, leaving only the uniform third beam spot. In accordance with a fundamental aspect of the present invention, the slit in the experiment just described transmits an energy-depleted beam, the wave-like properties of which interfere with the third beam, acting as a reference beam.

These resultant spatial interference patterns are quantified by dividing the photodetector surface into a fine matrix of individually sensitive photodetector elements. These elements must be small enough to sample the separate bright and dark bands on each of the two interference patterns. The differential readings of the neighboring photodetector elements identify the presence and relative contrast of the interference patterns. A detector that can provide such readings of a spatial interference pattern constitutes one embodiment of an interference detector. It may be appreciated that other embodiments of interference detectors known in the art are also applicable to the invention.

In general terms, interference detection combines a signal beam and a reference beam and, with an appropriate detector, measures interference properties of the combined beams. The invention demonstrates that interference properties are still present even when the signal beam is energy-depleted.

The apparatus is adapted to communications by modulating the energy-depleted beams in accordance with a set of data. The modulator may be an electronically variable transmission device of a type known in the art and normally used to control the intensity or the phase of a photon beam. The invention is also applicable to communications in signal processing systems, such as high speed computers, where energy density is a limiting factor, since the signal beam in the invention transmits information with very little energy.

The invention is also adaptable to communications where only the modulated energy-depleted beams are transmitted over the intervening space to a distant receiver detector. In this application, the required reference beam is generated with the same wavelength as the signal beam by an independent coherent source in the locality of the receiver. Transitory mutual coherence of the modulated energy-depleted beams and the independent source requires sufficiently rapid response time of receiver detector elements.

Transmission media appropriate to the transmission of energy-depleted beams are the same as those used for the corresponding radiation not depleted in energy. For example, energy-depleted radio wave radiation can be transmitted through vacuum or atmosphere. Similarly, energy-depleted light can be transmitted on fiberoptic cables.

The apparatus is adaptable to analysis of a specimen by directing the energy-depleted beams at the specimen and assessing the resultant interference contrast or phase shift. This application permits the analysis of a specimen without unwanted energy deposition in the specimen.

Briefly, and in general terms, the energy-depleted radiation generator of the invention comprises at least one conventional source of radiation providing at least one coherent beam of energy-bearing radiation; and at least one beam interaction element, including at least one interaction region into which is input the beam of energy-bearing radiation, and from which is derived at least one energy-depleted radiation beam having wave properties identical to those of the conventional source of radiation. More specifically, the conventional source of radiation in one embodiment of the generator provides first and second coherent radiation beams, and the beam interaction element includes means for directing the first and second coherent radiation beams along paths that intersect in the interaction region and produce an interference pattern with zones of constructive interference and zones of destructive interference. The beam interaction element also includes means for selectively transmitting energy-depleted radiation from at least one zone of destructive interference in the interaction region. The means for selectively transmitting energy-depleted radiation includes a transmissive aperture positioned in the interaction region and aligned with a zone of destructive interference. The aperture transmits intersecting out-of-phase energy-depleted radiation that diverges beyond the aperture into individual spatially separated beams of in-phase energy-depleted radiation.

In another embodiment of the generator, the conventional source of radiation provides first and second coherent radiation beams and each of the beam interaction elements includes a photorefractive device and means for directing the first and second coherent radiation beams into the photorefractive device in such a manner that energy is coupled from one beam to the other in the photorefractive device, resulting in output of an energy-depleted beam and an energy-enhanced beam. The generator may include a plurality of similar photorefractive devices coupled together in a series chain such that the energy-depleted beam and the energy-enhanced beam from one photorefractive device are input to a next photorefractive device, and wherein the series chain of photorefractive devices provides successively greater levels of energy depletion in the energy-depleted beam.

In yet another embodiment of the generator, the conventional source of radiation provides a single radiation beam, and the beam interaction element includes at least one directional coupler having first and second waveguides. The single radiation beam is input to the first waveguide and the directional coupler is configured to transfer energy from the first waveguide to the second waveguide, leaving an energy-depleted beam for output from the first waveguide. Optionally, the generator may include a plurality of similar directional couplers connected together in multiple stages such that an energy-bearing beam from the second waveguide of one directional coupler is connected as the first waveguide of a next directional coupler. The multiple stages of directional couplers provide multiple outputs of energy-depleted beams from the first waveguide in each stage.

Any of these generators of energy-depleted radiation may also include a radiation modulator, for selectively modifying a property of the energy-depleted radiation. The modulator may include means for encoding data onto the energy-depleted radiation, or may take the form of a specimen on which the energy-depleted radiation impinges.

Another important aspect of the invention resides in a device for restoring energy to energy-depleted radiation. Most generally, this energy restoring device includes an external source of energy coupled to an energy-depleted radiation beam in an interaction element.

In several embodiments of the energy restoring device, the external source of energy is a reference beam coherent with an energy-depleted radiation beam and the device includes a beam interaction element having an interaction region, means for directing the energy-depleted radiation beam and the reference beam into the interaction region, and means for directing energy-restored radiation from the interaction region.

In one embodiment of the energy restoring device, the interaction region of the beam interaction element includes an interference zone, and interference of the energy-depleted beam and the reference beam produces interference bands of energy-restored radiation. The means for directing energy-restored radiation from the interference zone produces an energy-restored output beam having identical wave attributes to the input energy-depleted beam.

In another embodiment of the energy restoring device, the beam interaction element includes a two-beam coupler in which energy is coupled from the reference beam to the energy depleted beam, producing an energy-restored output beam having identical wave attributes to the input energy-depleted beam. This embodiment of the device may further include at least one additional two-beam coupler, for restoring additional energy to the energy-restored output beam from the first two-beam coupler.

In other embodiments of the energy restoring device, the beam interaction element includes an optical amplifier. In one embodiment, the optical amplifier consists of a device having two input ports through which an energy-providing conventional shorter wavelength beam and the energy-depleted beam are introduced, and having an output port for an energy-restored beam derived by coupling energy from the shorter wavelength beam to the energy-depleted beam. In another embodiment, the optical amplifier consists of a device in which input electrical energy is coupled to the input energy-depleted beam to provide for an output energy-restored beam. Optionally, for either embodiment, the device further includes at least one additional optical amplifier, for restoring additional energy to the energy-restored output beam from the first optical amplifier.

It will be appreciated from the foregoing that the receiver of energy-depleted radiation in this invention uses interference detection of the energy-depleted radiation beam or, alternatively, energy-restoration of the energy-depleted radiation beam with subsequent conventional detection of the energy restored beam.

The invention, which may also be expressed in terms of a method, has other embodiments combining the energy-depleted generators, detectors, energy-restorers, modulators and demodulators to achieve more specific goals. As well as communications, and specimen analysis, the invention may also be applied to the retrieval of recorded information from a photorefractive medium, and to a process for making holographic recordings. Both of these applications benefit from the use of energy-depleted radiation.

It will also be appreciated from the foregoing that the present invention represents a significant, if not revolutionary, advance in the propagation of signals as radiation. A number of embodiments of the invention have been mentioned in this summary. Further variations of the apparatus and method of the invention will become apparent from the following more detailed description, including embodiments of the invention applied to communication systems, specimen analysis systems, and holographic and photorefractive recording systems. It will be appreciated from the description that follows that the invention is applicable to particle radiation systems, such as systems using electron radiation, as well as to electromagnetic radiation systems operating at various wavelengths.

BRIEF DESCRIPTION OF THE DRAWINGS

FIG. 1 is a schematic diagram showing a transmitter and receiver of energy-depleted radiation and illustrating the general principles of the invention;

FIG. 1A is a diagram showing a portion of FIG. 1, but enlarged and distorted in scale to exaggerate optical beam divergence and separation;

DESCRIPTION OF THE PREFERRED EMBODIMENTS

Figure 1B:
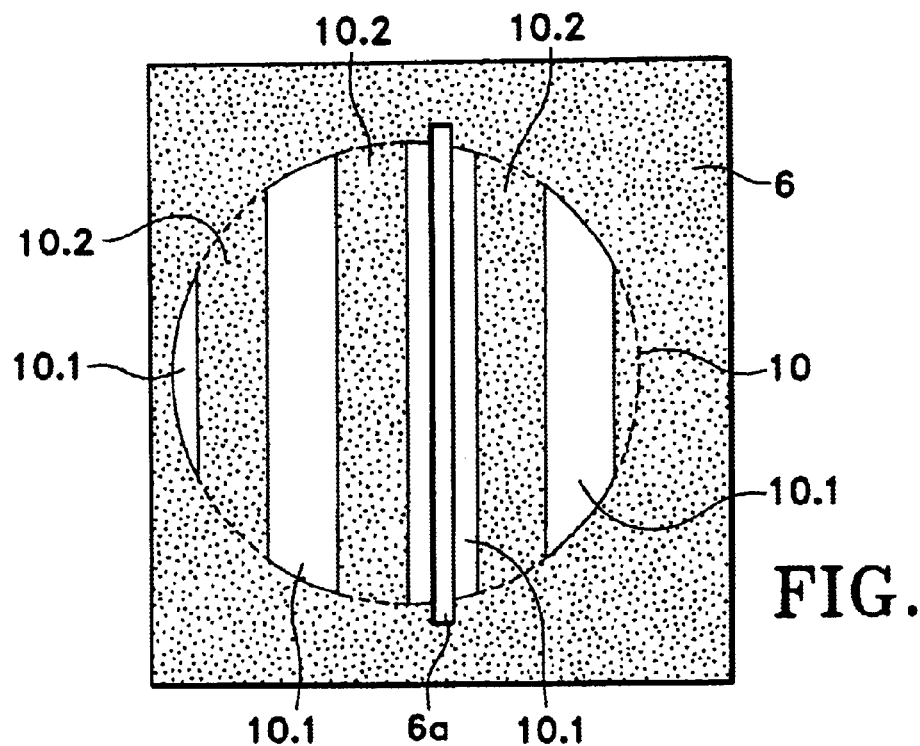
FIG. 1B is a more detailed view of the slit aperture in FIG. 1, showing the transmissive slit aligned with one of the bright bands of the interference pattern.

As shown in the drawings by way of illustration, the present invention pertains to apparatus, and a related method for its use, for transmitting and receiving an energy-depleted radiation beam. As outlined in the foregoing background section, there are many situations in which it would be desirable to transmit radiation, such as electromagnetic radiation, at a significantly reduced energy level, but without commensurately reducing the detectability of the signal.

Basic Principle and Experimental Verification of the Invention

Using the apparatus shown in FIG. 1, the inventors have verified the transmission and detection of energy-depleted radiation beams with three configurations of the apparatus. It will be appreciated that the apparatus described is only a single possible embodiment of the invention.

In a first configuration, referred to as configuration I, a laser, indicated by reference numeral 1, projects a coherent electromagnetic radiation (photon) beam toward a first beam splitter 2, which produces a reflected beam 10a and a transmitted beam 10b. The transmitted beam 10b is reflected from a second beam splitter 3, and reflected again from another beam splitter 4. The reflected beam 10a is reflected by a beam splitter 5 and is transmitted through the beam splitter 4, such that the two beams 10a and 10b, equal in intensity, are rejoined with slight relative angulation at a slit aperture equipped screen 6. The desired relative angular orientation of the two beams 10a and 10b can be obtained by properly adjusting the beam splitter elements 3, 4 and 5.

For simplicity in FIG. 1 and in subsequent figures, partially transmitted or reflected beams not utilized in the operation of the invention are omitted. For example, the partially transmitted beam at beamsplitter 5 is not shown. In this context, it should be noted that element 5 is a beamsplitter instead of a mirror as one means of maintaining the required equal intensities for beams 10a and 10b as they converge at screen 6.

The rejoined beams 10a and 10b form a bright and dark band interference pattern on screen 6 as shown in FIG. 1B as a roughly circular beamspot 10. Bright bands are indicated at 10.1 and dark bands are indicated at 10.2. The narrow slit aperture 6a on screen 6 is, for configuration I, aligned to transmit only from a single bright band, as shown in FIG. 1B. The slit width, however, must exceed the Frauenhoffer limit for diffraction. A resultant pair of beams 11a and 11b transmitted through the slit produce a pair of separate bright-band beam spots on a distant observation screen 8. Photons leaving the slit aperture on screen 6 diverge into the two distinct beams 11a and 11b due to the angulation of beams 10a and 10b intersecting on the slit aperture of screen 6. The location and relative angulation of beams 11a and 11b are controlled by lenses 16 and 17 positioned on each side of the screen 6. FIG. 1A shows the slightly diverging paths of beams 11a and 11b more clearly than in FIG. 1. It will be understood, however, that the scale of FIG. 1A is deliberately distorted to exaggerate the divergence and separation of beams 11a and 11b.

A beam 12, which is a transmitted portion of the original beam 10b striking beam splitter 3, is directed to a mirror 9 and then to yet another beam splitter 7. Beam splitter 7 is disposed in the path of the beams 11a and 11b from the screen 6, between lens 17 and the observation screen 8. Beam 12 serves as a reference beam and is directed with slight relative angulation to coincide with beams 11a and 11b on observation screen 8 producing, as expected, an interference pattern. Again, FIG. 1A best illustrates, by exaggeration, the relative size and direction of beam 12 with respect to beams 11a and 11b.

On screen 8, beam 12 appears as roughly circular beam spot. Because of the screen 6 slit aperture, the beam spots 11a and 11b appear as a parallel pair of elongated ovals superimposed on the larger circular beam spot 12 on screen 8 as shown in FIG. 2.

Figure 2:
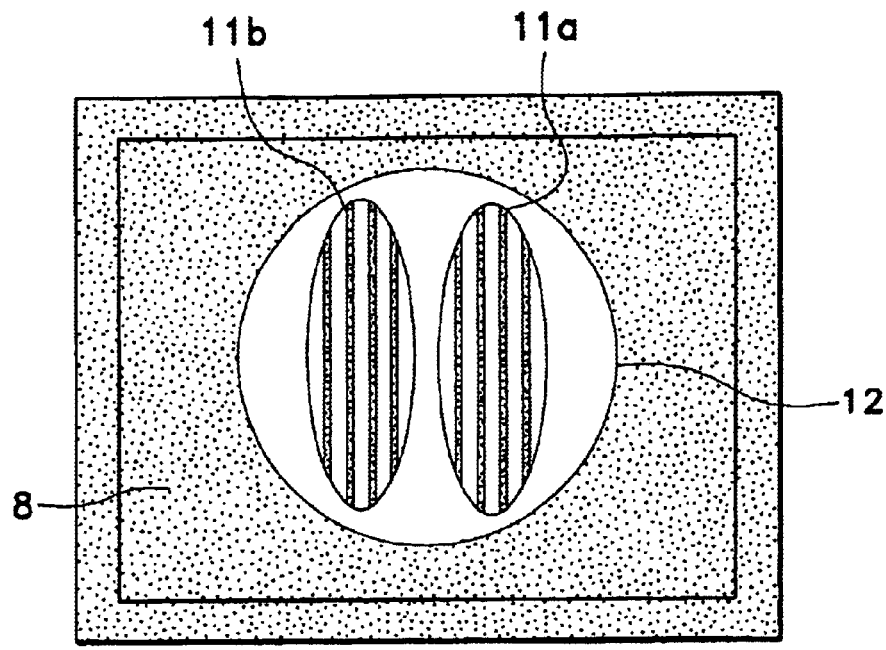
FIG. 2 is a more detailed view of the receiver detector screen in FIG. 1, showing relevant incident beam spots.

Another lens 14 is positioned in the path of beam 12 and enlarges or condenses the beam spot of beam 12 such that the energy flux (energy per unit area) on screen 8, FIG. 2, for beam spot 12 is the same as that of beam spots 11a and 11b, verified while blocking beams 10b and 10a, respectively. This insures that interference on the beam spots 11a and 11b arising from beam spot 12 will exhibit maximum contrast.

Figure 1C:
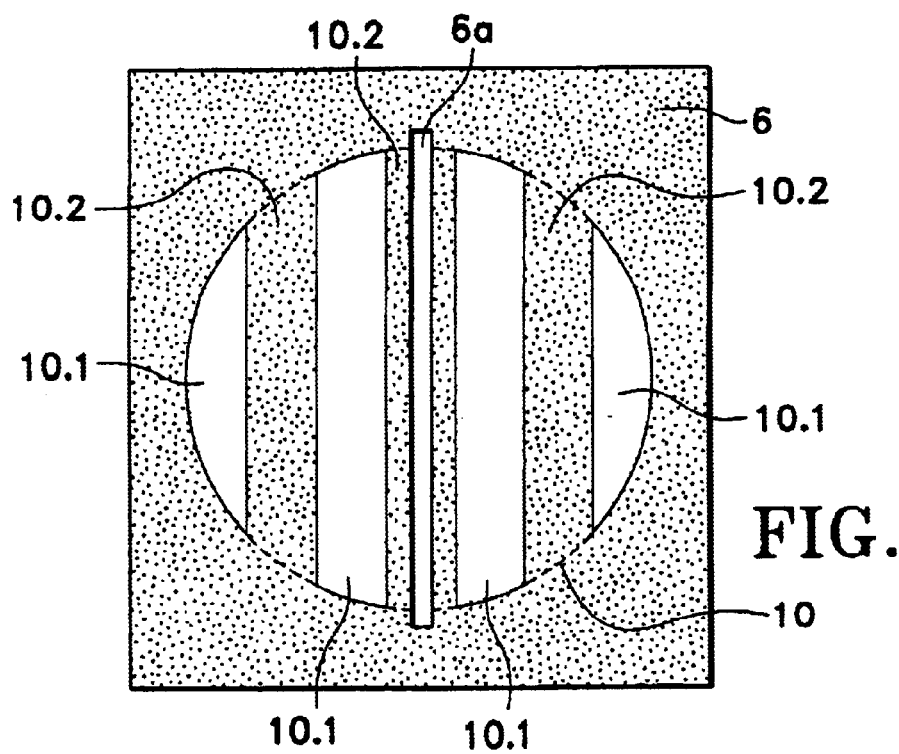
FIG. 1C is a view similar to FIG. 1B except that the slit is aligned with a dark band of the interference pattern.

The FIG. 1 apparatus directly relevant to the invention requires only the adjustment of the slit aperture on screen 6 to give alignment of the slit 6a with a dark band 10.2 on that screen, as shown in FIG. 1C. With this alignment in place, the FIG. 1 apparatus is said to be in configuration II.

The resultant transmitted intensity of the dark band in configuration II is only a small fraction, e.g. 0.15, of the transmitted intensity of the bright band in configuration I. Nevertheless, the contrast of the peaks and valleys of the interference pattern on screen 8 in configuration II is comparable to the contrast observed on the interference pattern in configuration I, even though the energy flux contribution from the dark band is only 0.15 of that for the bright band. These configuration II results are central to the operation of the invention and constitute a demonstration of energy-depleted radiation beams.

A further verification that the configuration II results are valid is based upon a third configuration, referred to as configuration III. Configuration III, for which the slit aperture is aligned as in FIG. 1A, is similar to the preliminary configuration I, except that a 0.15 transmission filter 13, absent in Configuration I (and II) is interposed in the path of the beam, between the lens 16 and the aperture screen 6. This filter reduces the bright band transmission to an energy flux equal to that of configuration II. However, the interference pattern on screen 8 now has extremely low contrast, i.e. the interference condition is essentially absent.

Several relevant conclusions regarding the functionability of the invention can be reached without requiring a theoretical understanding of the underlying physical phenomenon.

Since configurations I and II show good contrast on screen 8, the wave intensity from beams 11a and 11b, and from beam 12 must be comparable in both configurations. This is believed to be a valid conclusion because interference is a wave-based constructive and destructive phenomenon requiring two equal intensity intersecting waves for the optimum contrast condition to be achieved.

Conversely the interference pattern contrast was severely diminished in configuration III because the filter 13 blocked not only the energy flux aspect of beams 11a and 11b but also the wave aspect of beams 11a and 11b. Again, this conclusion is believed to be valid because poor interference contrast can be attributed to two intersecting waves of significantly unequal intensities.

These three configurations collectively imply that a radiation beam has two attributes, an energy flux attribute and a wave attribute. The energy flux attribute of a beam is detectable by a conventional photocell or similar device. The wave attribute of a beam is measurable by intersecting the beam with another, mutually coherent, beam, and observing interference contrast.

In the present case, beams 11a and 11b in configuration II are depleted of the energy flux attribute by placement of the aperture screen 6 to block all but a dark band. However, the wave attribute of this transmitted dark band in the critical configuration II appears to be equivalent to the wave attribute of the transmitted bright band in configuration I.

The invention utilizes the critical configuration II, in which beams 11a and 11b have the full wave attribute but have severely depleted energy flux. A practical embodiment of the invention also includes a beamline component 15, or modulator, positioned between the lens 17 and the beam splitter 7, to modulate the beams 11a and 11b in some manner. When the beamline component 15 is an electronic filter, of the type known in the art normally used to modulate a conventional photon beam transmission intensity in a coded sequence, then both beam spots 11a and 11b on screen 8 (FIG. 2) exhibit a similarly varying interference pattern contrast in the same sequence. Similarly, when the beamline component 15 is an electronic phase shifting device known in the art, then modulation by this device produces a related interference band pattern shifting on screen 8.

This is a significant result with respect to the invention because it demonstrates that a modulation of a severely energy-depleted beam transmitted over a distance is still detectable at a receiver of the energy-depleted beam.

In a practical embodiment of the invention, the screen. 8 is a detector comprising an array of photo-sensitive elements (not shown). These elements are each sufficiently small to be capable of sampling individual bright or dark interference bands incident on detector screen 8. The differential outputs of adjacent elements provide a measurement of the interference contrast and band pattern shifting.

In operation of the apparatus in FIG. 1 as a communication system, data signals are encoded onto the output of beams 11a and 11b by the modulator 15 and are decoded by the differential outputs of the screen 8 operating as a decoder.

Figure 3:
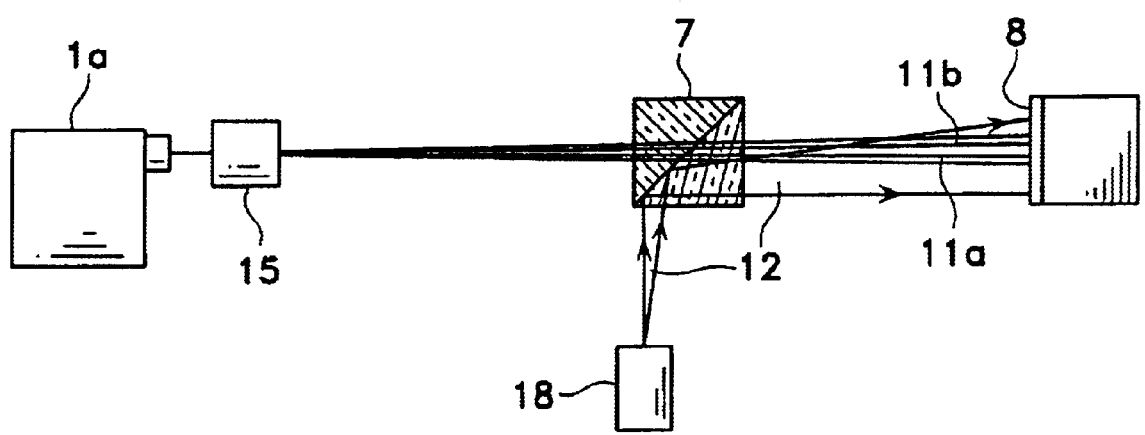
FIG. 3 is a schematic diagram showing an alternative embodiment of the invention for which only energy-depleted radiation interconnects a transmitter and a receiver.

An alternate embodiment of the invention is shown in FIG. 3. In this separated form, the apparatus on the left side of the figure is an energy-depleted radiation transmitter 1a with its associated modulator 15, and the apparatus on the right side of the figure is an energy-depleted radiation receiver, comprising a reference beam laser 18, a beam splitter 7 and a detector 8. In this embodiment, a laser in transmitter 1a generates the signal beams 11a and 11b and the reference laser 18 of the same wavelength at the receiving site is used to generate a coherent reference beam 12.

Application to Communication Systems

In the embodiment of FIG. 3, only the signal beams 11a and 11b, which are severely diminished in energy flux, are transmitted over an intervening distance to the receiving site. Accordingly, the apparatus of FIG. 3 is of particular use in operation of the invention for transmission of data to a distant point. With the two separate laser sources (within 1a and component 18) in this embodiment, the interference patterns on detector 8 are still present when beam modulator 15 gives full transmission. However, because lasers exhibit a brief but finite coherence time (during which there are no abrupt phase changes), the interference pattern contrast measured by an array of detector elements on detector 8 must have a resolving time shorter than the laser coherence time. Both lasers (within 1a and component 18) have relative mutual coherence relationships that yield an interference pattern. When one laser or the other has an abrupt random coherence phase change at the end of a coherence time, there is a resultant altered mutual coherence relationship. Nevertheless, a slightly shifted interference pattern is immediately formed and persists until the next random phase change of one of the lasers occurs. The interference pattern disappears when the beam modulator 15 transmission is zero.

Application to Specimen Analysis Systems

Operation of the invention as a specimen analyzer utilizes the apparatus depicted in FIG. 1. In this context, the specimen itself becomes the beam modulator 15. When a specimen 15 is inserted into the beam path of 11a, 11b, the alteration of interference on detector 8 gives a measurement of that segment of specimen 15 traversed by beams 11a, 11b. Scanning and rotating specimen 15 relative to beams 11a, 11b provides a set of data suitable for three-dimensional reconstruction of specimen 15 with regard to beam transmission and phase alteration parameters.

Figure 4:
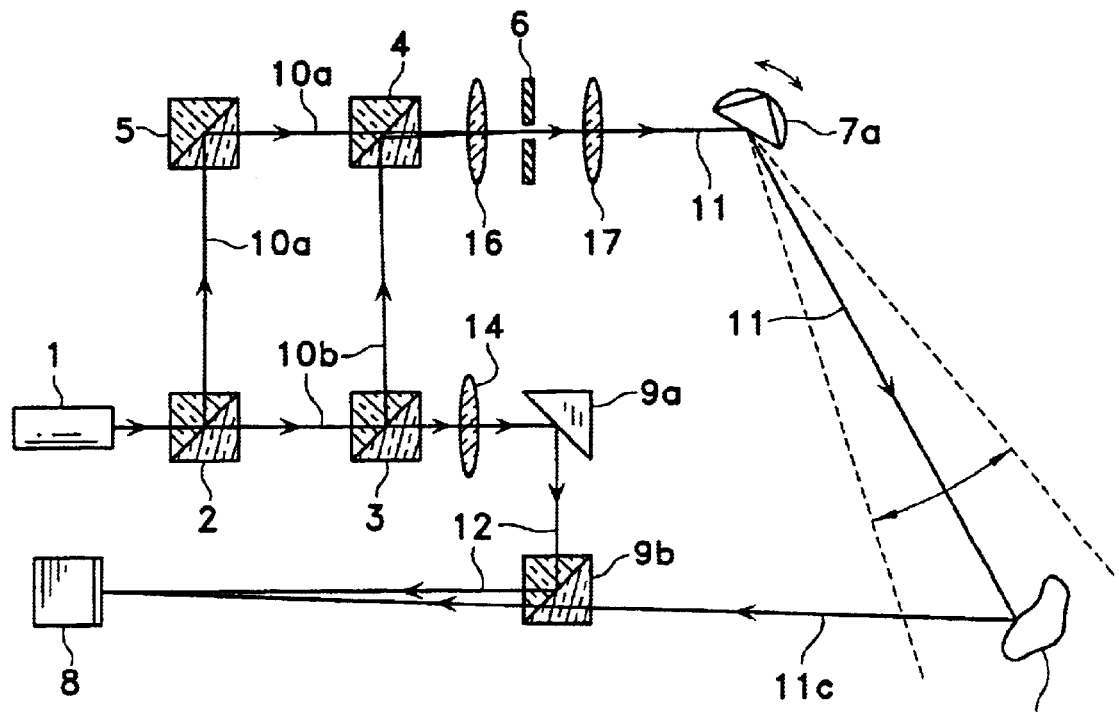
FIG. 4 is a schematic diagram depicting an alternative embodiment of the invention applicable to specimen analysis.

Apparatus depicted in FIG. 4, with beam scanning shown, is one embodiment of the invention in operation as a specimen analyzer. Rotatable mirror 7a scans an energy-depleted beam 11 across a region in which a specimen 15 may be located. Beam portion 11c, scattered off of specimen 15, is received by detector 8 causing interference with reference beam 12 directed to detector 8 by mirror 9a and beamsplitter 9b. The detected interference provides data for analyzing parameters of a specimen 15 located in the scanned region.

In the operation of the invention as a specimen analyzer, the specimen 15 is not subjected to energy deposition because the beam used to analyze the specimen is depleted of energy.

Theoretical Basis for the Invention

Figure 5:
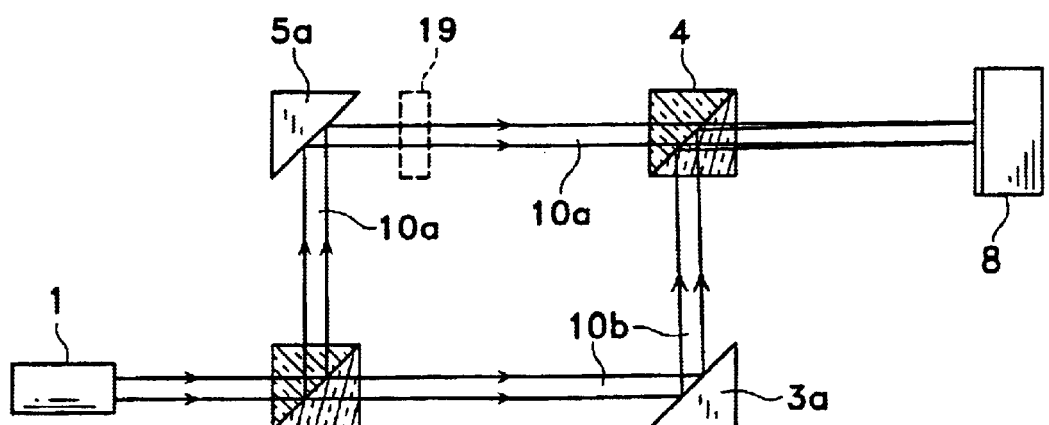
FIG. 5 is a schematic diagram showing selected components from the FIG. 1 apparatus, and demonstrating the underlying operating principle of the invention.

Certain of the underlying operational characteristics of the invention are best understood by consideration of the apparatus depicted in FIG. 5, which is similar to portions of the apparatus of FIG. 1. The same reference numerals have been used to identify corresponding components in the two figures.

The FIG. 5 apparatus readily demonstrates an interference pattern beamspot on observation screen 8 clearly visible to the unaided eye even when laser 1 emits a relatively low intensity beam.

Classical physics provides an apparently plausible explanation of this phenomenon. Since a relatively low intensity beam still, nevertheless, contains vast numbers of photons, all of the same wavelength in coherent motion, such a beam may be treated as a classical continuous wave structure. Beamsplitter 2 divides this beam into beams 10a and 10b, each also having a continuous wave structure.

The optical alignments of beamsplitters 2 and 4 and mirrors 3a and 5a are set to rejoin beams 10a and 10b, with slight relative angulation, to a single beamspot on screen 8. Note that the total optical path lengths of beams 10a and 10b are identical. This feature insures a strong interference phenomenon even when the beam source 1 emits with a finite coherence time.

It may readily be understood, given the essentially continuous wave structures of beams 10a and 10b, that at each point along these intersecting beams approaching the screen 8 beamspot, a multiplicity of photons on beam 10a mutually interfere with a multiplicity of photons on beam 10b. The resultant mutual interference encountered by photons from each beam approaching screen 8 causes photons from both beams to deflect slightly onto intersecting beam regions of mutual constructive interference and away from intersecting beam regions of mutual destructive interference. The consequence is that the beamspot on screen 8 exhibits a banded interference pattern.

The above classical explanation, however, proves to be inadequate when considering the well known results of similar experiments conducted with extremely weak beams. It is well known in the art that extremely weak laser beams can be generated such that only a single photon is present in the beam. In the FIG. 5 apparatus, for example, it is possible to have only a single photon between the laser 1 and the observation screen 8 at any given time. Clearly, no beamspot on observation screen 8 is visible to the unaided eye under such circumstances. However, it is further well known in the art that, in the presence of such an extremely weak laser beam, an interference pattern still accumulates over time after many photons are transmitted onto observation screen 8 if the screen is of a type that will register the cumulative impact sites of many photons. The screen may be, for example, a photographic plate. It is accepted in the art that the consequent interference pattern cannot be explained by photons interfering with photons.

The usual explanation of this phenomenon given in the art is based upon the probabilistic interpretation of quantum mechanics. This interpretation generated considerable controversy in the late 1920's when it was developed because it violates classical physics. Nevertheless, the probabilistic interpretation has become the commonly accepted version of quantum mechanics.

With regard to the apparatus in FIG. 5, the probabilistic interpretation contends that, upon reaching beam splitter 2, each photon simultaneously traverses beam path 10$a$ and beam path 10$b$, exists-only as a non-real probability wave on both beam paths, and, quite literally, interferes with itself upon approaching the observation screen 8. Each self-interfering photon finally materializes at one of the constructive interference bands on screen 8 as the photon acquires the real property of energy.

The probabilistic interpretation further justifies this description by citing the well known results for the following experiment.

When a photon energy detector 19 is inserted into beam path 10$a$ whereby that beam path is blocked, the cumulative image on the screen 8 photographic plate now shows a uniformly illuminated beamspot instead of the banded interference pattern previously observed. Furthermore, only half as many photons now reach screen 8. For each of those photons intercepted by the detector 19 inserted in beam path 10$a$, the detector always records the complete undivided energy normally associated with photons emitted by laser 1.

The probabilistic interpretation explains these results by asserting that the parts of the photon on 10$a$ and 10$b$ are each a 50% probability wave. When the part on the blocked path 10$a$ strikes the inserted detector 19, one of the two parts, with equal probability, instantly vanishes as a probability wave even though the two parts may be separated by a very substantial distance. This aspect is in particular conflict with classical physics.

For 50% of such events, the probability wave part on the blocked path 10-$a$ vanishes. The part-remaining on 10$b$ instantly becomes a full 100% probability wave and continues on its prior course toward screen 8. From such events, a simple uniform beamspot accumulates on screen 8 since there is no interference from the blocked path 10$a$.

Alternatively, for the other 50% of all events, the part on 10$b$ vanishes as the part on 10$a$ strikes the inserted detector 19. The 10$a$ part instantly becomes a full 100% probability wave of the photon. This photon materializes as it interacts with inserted detector 19, acquires the real property of photon energy, and promptly deposits that energy into inserted detector 19.

The commonly accepted probabilistic interpretation of this phenomenon m quantum mechanics has been challenged by at least two well known physicists: de Broglie, in 1927 (reported in Rapport au V'ieme Congres de Physique Solvay. Gauthier-Villars, Paris (1930)), and Bohm, in 1952 (Phys. Rev. 85, 166 and 180 (1952)). With regard to the above phenomenon, both theorized that a real wave attribute of the photon was split into two real parts and traveled both paths while a separate energy attribute traveled in response to the interactions of the real wave attributes with each other and the apparatus. These aspects of their theories provide some insight into how the present invention functions. In agreement with de Broglie and Bohm, the present invention shows that waves travel on conventional optical trajectories, undergoing expected reflection and refraction, while the energy flux is deflected away from zones in which intersecting waves destructively interfere.

Historically, however, the theories of de Broglie and Bohm with regard to the separable energy and wave attributes never gained widespread acceptance as an alternative explanation of quantum mechanics. This was, in large part, because de Broglie and Bohm provided no independent resolution to a major underlying conflict in quantum mechanics commonly referred to as the Einstein-Podolsky-Rosen Paradox, described in a paper by A. Einstein, B. Podolsky and N. Rosen (Phys. Rev. 47, 777 (1935)). A more recent paper by Abner Shimony, "The Reality of the Quantum World," Scientific American, January, 1988, pp. 46–53, discusses this and related paradoxes of quantum mechanics. The physics community was not inclined to adopt an alternative explanation of quantum mechanics, such as proposed by de Broglie and Bohm, when that explanation: (a) introduced a new notion that a photon wave could travel separate from a photon energy and (b) still could not resolve the Einstein-Podolsky-Rosen Paradox.

One of the present inventors has recently provided a resolution to the Einstein-Podolsky-Rosen Paradox, in a paper entitled "Correlated photon asymmetry in local realism," by Stuart Mirell, published as a Brief Report of the American Physical Society, Physical Review A, vol. 50, no. 1, pp. 839–842. This resolution supports the separable nature of photon wave and energy proposed by de Broglie and Bohm, which, in turn, relates to the invention. Therefore, not only does the present invention have empirical verification, as discussed above with reference to the drawings, but it also has a rational theoretical basis.

Other Aspects of the Invention

Additional aspects of the invention may now be appreciated. One particular essential aspect of the invention relates to the beamline means for spatially separating the mutually destructively interfering energy-depleted beams 11$a$ and 11$b$ before these beams reach detector 8 as provided, for example, by lens 17 in FIG. 1. Without such separation, the out-of-phase beams 11$a$ and 11$b$ arriving superimposed on detector 8 would not produce interference with a reference beam 12.

In this context, it will also be appreciated that phase-shifting means known in the art may be readily applied to establish a same-phase relationship between beam 11$a$ and beam 11$b$. The two beams may then be rejoined to provide a single beam of doubled intensity energy-depleted radiation. This modification yields increased transmission range and improved detectability by a receiver.

In the same context, increasing the number of interfering beams incident on aperture screen 6 is known in the art to increase the concentration of energy flux onto beams of narrower angular range. A multiplicity of beam splitters or a diffraction grating may be used to generate such multiple interfering beams. The concurrent dark band destructive interference region comprising energy-depleted radiation is then dispersed over a wider angular range permitting the use of a wider slit aperture to selectively transmit energy-depleted radiation. Nevertheless, as with two beam interference of FIG. 1, energy-depleted radiation derived from multiple beam interference must be rendered non-destructive at the detector by spatial separation or by rephasing and rejoining.

Figure 1D:
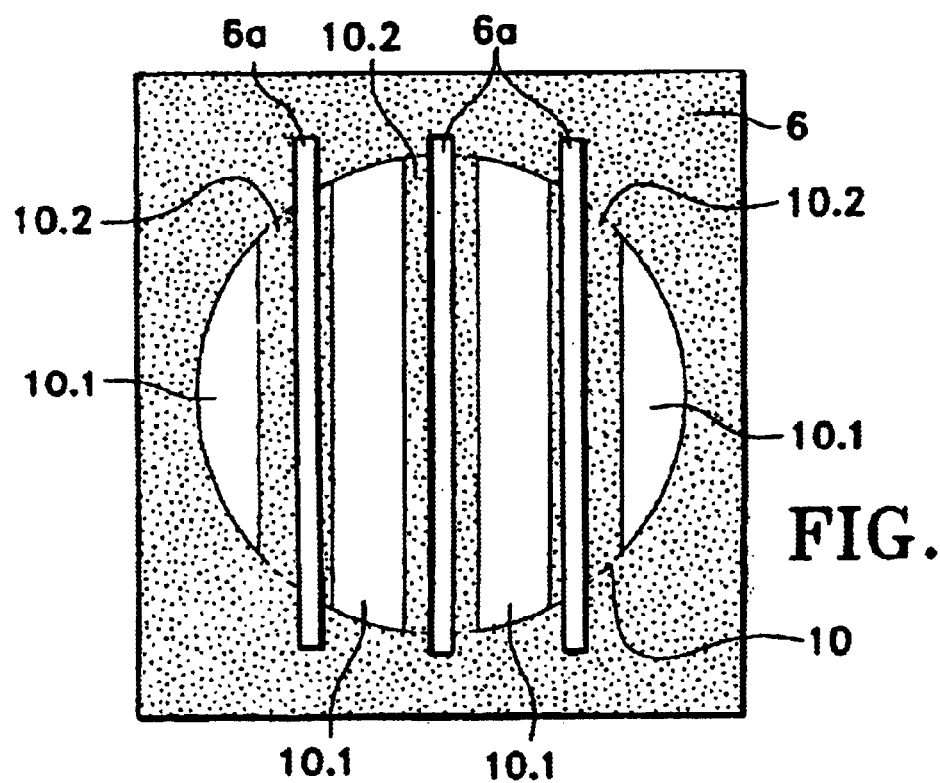
FIG. 1D is a view similar to FIG. 1C, except that multiple slit apertures are shown, each aligned within a zone of destructive interference.

In a related context, screen 6 in the various embodiments can include multiple apertures instead of a single aperture, as shown by way of example in FIG. 1D. These multiple apertures 6a, of which three are shown in FIG. 1D, are aligned to corresponding multiple destructive interference bands resulting in a proportionate multiplication of energy-depleted radiation beams being transmitted. Again, it is necessary that such radiation beams must be rendered non-destructive to each other at the detector.

The transmitted energy-depleted radiation can also be increased with respect to the operating energy of the transmitter by reducing the latter. This is accomplished by utilizing, instead of absorbing, the energy flux incident on the aperture screen surface. The energy flux can be converted into electrical energy to augment power to the signal beam source. Alternatively, the energy flux can be used without conversion by re-directing the energy flux to augment the incident beam.

Restatement of the Principles of the Invention

From the foregoing description of the invention, it will be understood that the invention utilizes the observed principle that wave attributes of radiation follow classical trajectories, whereas energy flux is seen to propagate generally on these wave attributes, but deflects preferentially along regions of constructive interference when waves intersect. Converging wave attributes of an energy-depleted beam that interfere destructively do not destroy one another, as demonstrated by the ability of such waves, after diverging, to effectively participate in interference with energy-bearing reference beams. Moreover, as has been demonstrated, the diversion of energy flux away from a particular beam trajectory is often accompanied by the continued propagation of energy-depleted wave attributes along that trajectory. These principles yield several additional novel aspects of the invention, which are discussed in the following sections.

Two-beam Coupling

The phenomenon known as two-beam coupling in photorefractive materials has particular relevance to the invention. When two laser beams of the same wavelength intersect in a photorefractive material, the resultant light interference pattern generates a local periodic refractive index grating pattern. The phenomenon is described by David M. Pepper et al. in "The Photorefractive Effect," Scientific American, Oct. 1990, pp. 62–74. The light interference and refractive index patterns have the same periodicity but are relatively displaced by a 90-degree phase shift.

With proper orientation of the photorefractive material and the incident intersecting laser beams, an energy flux exchange is observed, wherein the beams emerge from the interference zone with one beam increased in energy flux and the other beam decreased in energy flux. From the principles of the present invention, it will now be appreciated that the beam emerging from two-beam coupling with decreased energy flux is energy-depleted, but not reduced in wave attribute. It will be further appreciated that single-stage or multiple-stage photorefractive interferences may be used to generate an energy-depleted output beam in accordance with the invention. For multiple stages, the crystal orientation of the anisotropic photorefractive material is reversed from stage to stage so that one selected beam is progressively depleted of energy flux.

Figure 6:
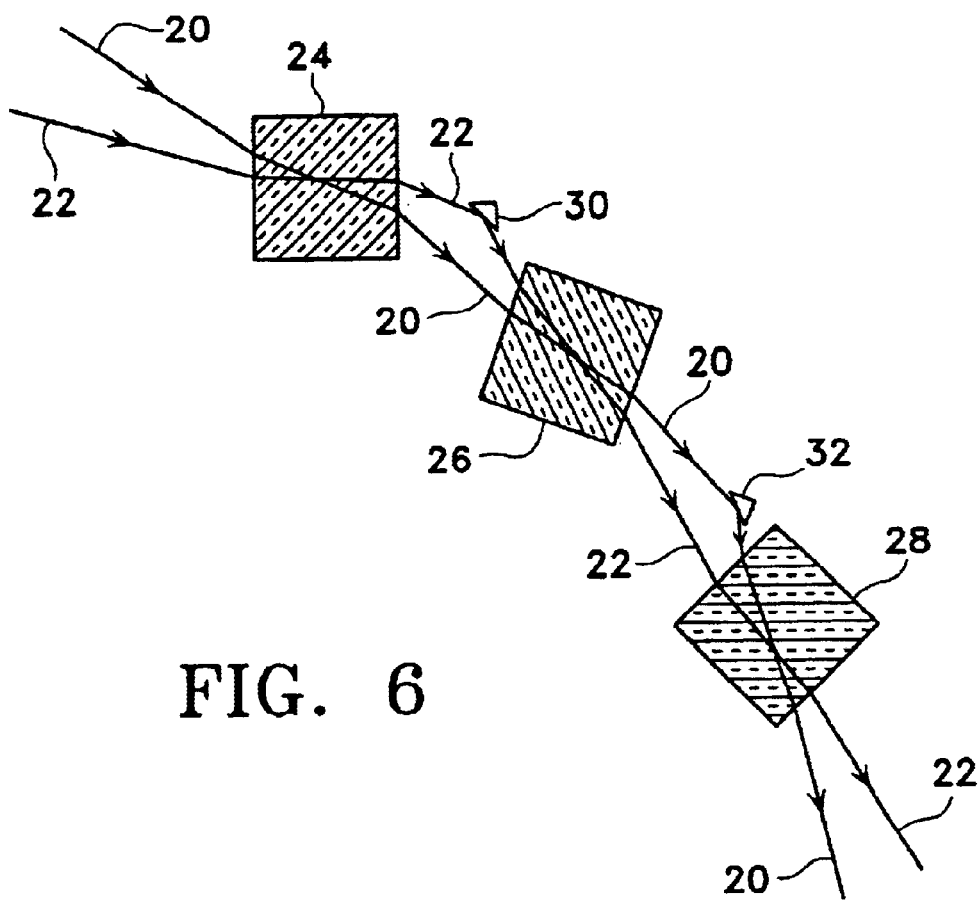
FIG. 6 is a schematic diagram showing a three-stage photorefractive energy-depleted radiation generator.

FIG. 6 depicts a three-stage photorefractive energy-depleter. Two mutually coherent beams 20 and 22 enter a first photorefractive crystal 24, which transfers energy flux from beam 20 to beam 22. This process, repeated at crystals 26 and 28, with the aid of mirrors 30 and 32, results in a significantly energy-depleted beam 20 as the final output.

Directional Coupling

Figure 7:
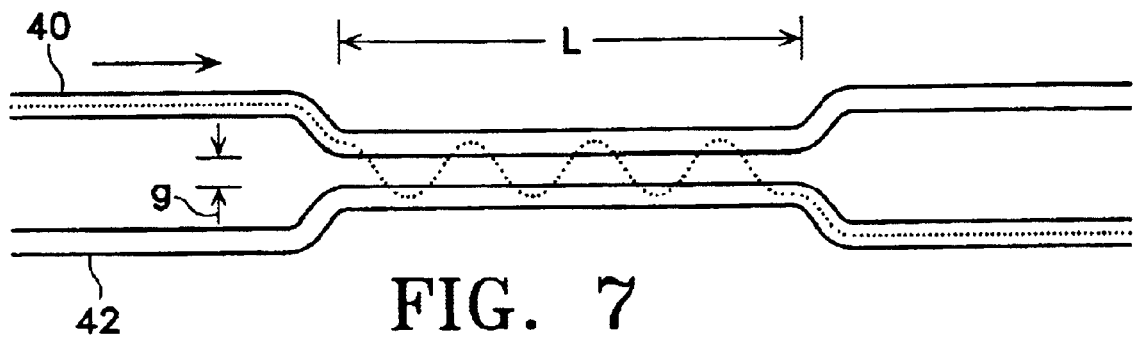
FIG. 7 is a schematic diagram showing the principle of the directional coupler.

Directional couplers are well known in the art. See, for example, "Optoelectronics—An Introduction to Materials and Devices," by Jasprit Singh, McGraw-Hill 1996, pp 115-18 and 425-27. As shown in FIG. 7, a pair of optical fiber guides 40 and 42 are separated by a narrow gap of spacing g over a length L, such that optical energy transfers from fiber 40 to fiber 42. As light progresses further along the length of the narrow gap zone, this process is repeated, with the optical energy moving back and forth between the fibers 40 and 42 as indicated by the broken line in the drawing. With proper control of the physical parameters, the final energy output can be confined to a single selected fiber 40 or 42.

It will by now be apparent from the principles of the present invention that a wave attribute is induced in fiber 42 complementary to the wave attribute already present in fiber 40. Thereby, energy flux transfers in an oscillatory manner between fibers 40 and 42. If the final energy output is then caused to be confined entirely to fiber 42, for example, then fiber 40 becomes a source of energy-depleted optical radiation.

Figure 8:
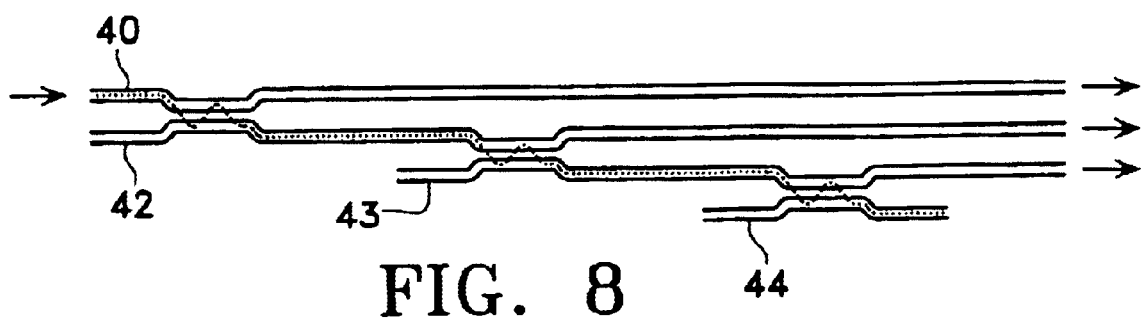
FIG. 8 is a schematic diagram showing a three-stage directional coupler used as an energy-depleted radiation generator.

Accordingly, a novel aspect of the present invention is the use of a directional coupler as an alternate source of energy-depleted radiation. Multiple stages of such directional couplers can be interconnected to generate large fluxes of energy-depleted radiation from a single input laser beam on fiber 40, as shown in FIG. 8. In a first stage, energy flux is depleted from fiber 40 and coupled into fiber 42. In a second stage, the energy flux in fiber 42 is coupled into a third fiber 43, leaving fiber 42 energy-depleted. Finally, in a third stage energy flux is coupled into a fourth fiber 44, leaving fiber 43 energy-depleted. Thus, three sources of energy-depleted radiation are output from the triple-staged directional couplers as indicated by the three adjacent arrows.

Beam Energy Restorers

Another feature of the invention is a beam energy restorer, which converts an energy-depleted beam into a conventional energy-bearing beam, including any modulation present on the energy-depleted beam. It will be readily appreciated that the use of an energy restorer at a receiving site renders an energy-depleted beam detectable by conventional receiver means known in the art and obviates the need for a receiver based upon interference detection as in detector 8 described with reference to FIG. 3. Two embodiments of a beam energy restorer are described in the following two sections.

Beam to Beam Exchange Energy Restorer

Figure 9:
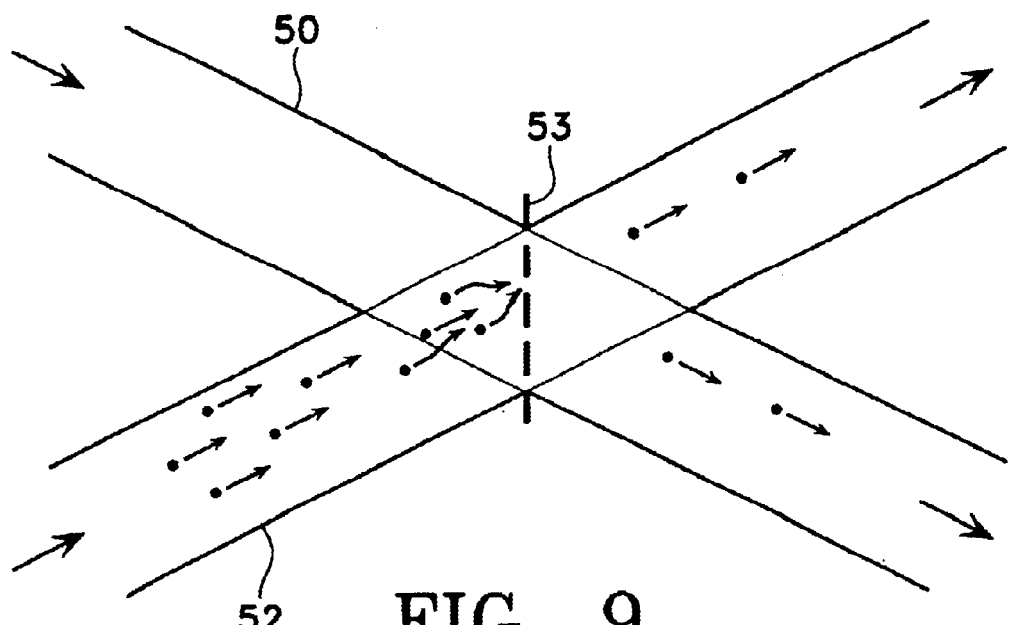
FIG. 9 is a schematic diagram showing the principle of energy restoral in a beam-to-beam exchange.

A beam to beam exchange energy restorer is shown diagrammatically in FIG. 9, which depicts an energy depleted beam 50 converging with a reference beam 52. Operation of this restorer is best understood by first considering that the beams 50 and 52 converge along nearly identical trajectories, the relative beam angles being highly exaggerated in the figure for clarity. Energy flux on the reference beam 52 is depicted as solid dots and the flux direction is shown by arrows. In the convergence region, the energy flux in the reference beam 52 is deflected onto mutually constructive interference zones. The presence of an interference pattern on an observation screen at location 53 gives evidence of this deflection. When the wave attribute flux (density per unit area) is the same for the two beams 50 and 52, the resultant interference pattern exhibits maximum contrast. The appearance of the pattern is notable in that it is indistinguishable from that produced instead by a pair of conventional energy-bearing beams.

The beam energy restorer is realized by omitting a screen at location 53, the maximum intersection point of beams 50 and 52. As shown, beams 50 and 52, which had converged at point 53, diverge beyond that location. The divergence is not unexpected since wave attributes follow classical optical trajectories and, in the present context, merely extend the trajectories of the previously converging beams. The significant feature of the energy restorer is that energy flux is transferred from the reference beam 52 to the previously energy-depleted beam 50. For clarity, only flux entering and leaving one of the several constructive interference zones, indicated by gaps in the location 53, is depicted in the drawing. The transfer of energy flux onto beam 50 occurs because the interference process deflects energy flux from the reference beam 52 onto the mutually constructive zones of beams 50 and 52. When the wave attributes of each are equivalent, the deflected energy flux has equal likelihood of exiting these zones onto either of the beams as they diverge. Therefore, half of the reference beam 52 energy flux is transferred onto beam 50 and half continues on beam 52. Furthermore, if the incoming energy-depleted beam 50 is modulated at some instant to give a reduced wave attribute, then there is a proportionate reduction in the likelihood of the energy flux transferring onto beam 50.

In this manner, the energy-depleted input beam 50 is converted to a conventional modulated energy-bearing output beam 50 by the described intersection with reference beam 52. The converted output beam 50 is then detectable by conventional means known in the art.

Optical Amplifier Energy Restorer

A second embodiment of a beam energy restorer is based upon optical amplifiers known in the art. For example, see "Optoelectronics—An Introduction to Materials and Devices," by Jasprit Singh, McGraw-Hill 1996, pp 457-61, or "Understanding Fiber Optics," Second Edition, by Jeff Hecht, Sams Publishing, 1993, pp. 165-70. Optical amplifiers directly increase the intensity of weak optical signals without intermediate electronic to optical conversions. Optical amplifiers include those utilizing doped fibers and variants of semiconductor lasers.

Figure 10:
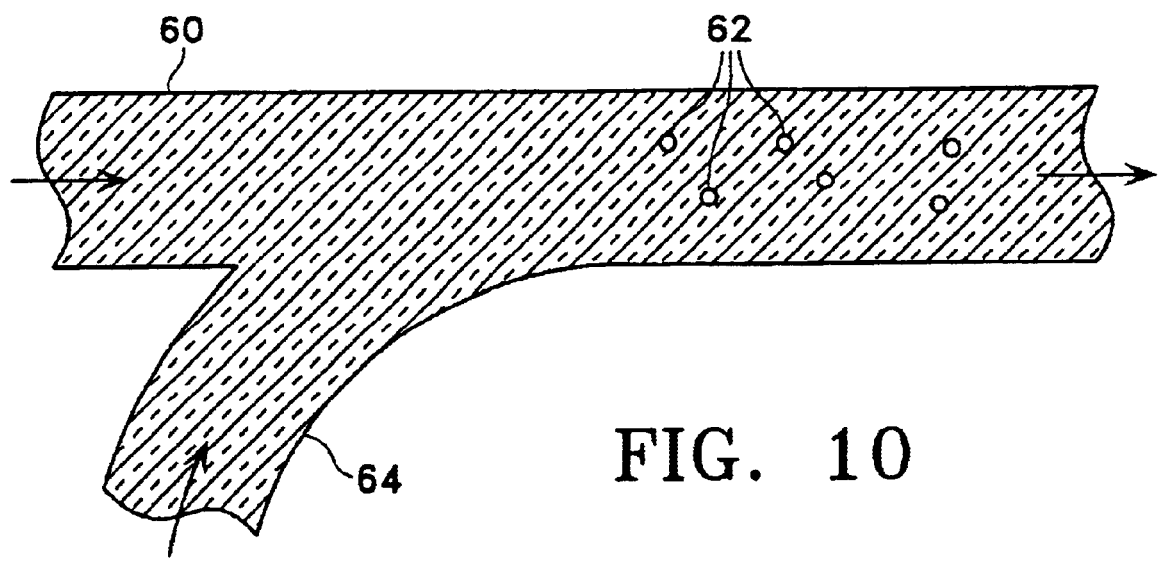
FIG. 10 is a schematic diagram showing the principle of energy restoral in an optical amplifier.

For example, the optical amplifier shown in FIG. 10 is constructed from a length of optical fiber 60 that has been doped with erbium atoms, indicated at 62. A beam of relatively energetic short-wavelength photons is injected along a fiber 64 that converges with fiber 60, to excite the erbium atoms to a higher energy state. When a weak, modulated coherent signal beam of lower energy, longer wavelength photons enters the erbium-doped fiber 60, the excited erbium atoms 62 are stimulated into emission. The erbium atoms emit photons having the same wavelength as that of the signal beam, and the relative number of erbium atoms stimulated to emit photons is proportionate to the signal beam modulation. These emitted photons are coherent with the signal beam, and thereby amplify the signal beam. The excited erbium-doped fiber assembly 60 and 62 effectively functions as a laser. Excess exciting short-wavelength photons on fiber 60 subsequently are filtered out of the resultant output beam.

The emission stimulation is triggered by the wave attribute of the input coherent signal beam along fiber 60 as it passes the excited erbium atoms 62. Accordingly, it will be readily appreciated that substitution of an equivalent wavelength energy-depleted coherent signal beam, which may be modulated, also causes emission stimulation. The consequent output of the fiber 60 is then a conventional energy-bearing signal, which would exhibit any modulation of the input beam as an energy flux modulation. A similar result is achieved with a semiconductor laser optical amplifier in which the source of external energy coupled to the input energy-depleted beam is electrical instead of short-wavelength photons as in the doped fiber optical amplifier.

The energy-bearing output beam can, of course, be readily detected by conventional means. Thus, the use of an energy restorer using emission stimulation in an optical amplifier provides another technique for detecting modulation in energy-depleted radiation.

Photorefractive Applications of the Invention

The present invention has particular novel applications for a class of materials exhibiting photorefractive properties. These materials, alluded to above in the discussion of two-beam coupling, are described in "The Photorefractive Effect," by David M. Pepper et al., Scientific American, Oct. 1990, pp. 62–74, and in "Holographic Memories," by Demetri Psaltis et al., Scientific American, Nov. 1995, pp. 70–76. Photorefractive materials are used in a wide variety of applications, such as in optical memory components. The refractive index of these materials changes when they are exposed to optical radiation. Examples of such materials include $Bi_{12}SiO_{20}$, $BaTiO_3$ and InP. Photorefractive devices may be volumetrically holographic or may be non-holographic. In either case, patterns of varying refractivity are written and stored in a photorefractive crystal by exposing it to corresponding patterns of incident photons. The writing process uses relatively energetic, short wavelength photon beams.

A subsequent readout process is usually accomplished with a beam of relatively less energetic, long wavelength photons in order to minimize unwanted destruction of the stored patterns. Nevertheless, this pattern destruction from the readout beam remains as a limitation of photorefractive devices.

The application of energy-depleted radiation provides a novel resolution of the problem. Apparatus such as that shown in FIG. 1, where the beam modulator 15 is a specimen of a photorefractive crystal, provides one embodiment relevant to a solution of the pattern destruction problem described above. Means may be provided for beam scanning of the specimen 15, as in the specimen analysis application described above. If the specimen has a refraction pattern already written, the readout can be accomplished using energy-depleted radiation, without disturbing the written pattern. Furthermore, the energy-depleted readout radiation need not be of relatively long wavelength. The ability to use a relatively short readout wavelength provides a substantially improved sampling resolution, with consequent increased data storage density.

It will be appreciated that the apparatus of FIG. 1, for example, can be readily reconfigured to perform the initial pattern writing process using a conventional energy-bearing photon beam. Therefore, the reconfigurable apparatus can operated in both write and read modes, but without the inherent shortcomings of the prior art.

Holography

As is well known in the art, holography, in a writing or recording mode, utilizes a coherent radiation beam that is split into an object incident beam and a reference beam. The reference beam is directed to a detector surface, such as a photographic plate, where it interferes with radiation that has interacted with the object and produces a holographic recording on the plate. In a reading mode, a reference beam is used in conjunction with the recording to recreate a holographic image of the object.

The present invention is ideally suited to applications of holography for recording holograms of objects without exposing them to energy-bearing radiation. Instead, an energy-depleted portion of an initial beam is directed onto the object and an energy-bearing portion of the initial beam is still used as the reference beam. With this modification, a conventional holographic interference recording is, nevertheless, obtained. The advantage of using an energy-depleted object beam is the absence of energy-bearing radiation incident on the object. Extremely intense energy-depleted radiation beams may be employed without detriment to or detection by the object.

Conclusion

It will be appreciated from the foregoing that the present invention represents a significant advance in a variety of fields involving signal propagation in the form of electromagnetic radiation. In particular, the invention provides a radiation beam that is significantly energy-depleted, but which still carries information that can be detected and utilized for various purposes. The basic principles of the invention may be applied to communication systems, in which an information beam may be transmitted over large distances in an energy-depleted form, to specimen analysis and imaging using energy-depleted beams that overcome difficulties encountered with energy deposition in conventional imaging systems, to devices and techniques using photorefractive materials, and to holography. The invention also encompasses various embodiments of sources of energy-depleted radiation, and various embodiments of energy restorers for converting energy-depleted radiation into conventional energy-bearing radiation.

It will also be apparent that, although a number of embodiments of the invention have been described in detail for purposes of illustration, various modifications may be made within the scope of the invention. For example, although the invention has been described in the context of using coherent optical radiation as the signal source, the invention is equally applicable to systems using other types of radiation, selected from another region of the electromagnetic spectrum, such as radio waves or x-rays. Similarly, other components of the invention disclosed as optical components have known equivalents that function in non-optical regions of the spectrum. For example, a wire screen mesh is functional as a beam splitter at appropriate microwave frequencies. Detectors are also known in the art for any applicable portion of the electromagnetic spectrum.

It will also be appreciated that the invention is not necessarily restricted to electromagnetic radiation. Particles also exhibit wave-like properties, including interference phenomenon. Accordingly, the invention described here is equally applicable in generating and detecting the particular type of waves associated with particles. By intersecting multiple coherent beams of particles, thereby creating an interference zone, "particle-waves" (depleted in particles rather than in energy flux) can be extracted by an appropriately placed aperture in the locality of a destructively interfering particle-depleted band. Accordingly, one application of this embodiment of the invention is a particle-depleted analog to the electron microscope.

From the foregoing, it will be understood that the present invention has extremely broad scope and applicability, and should not be limited except as by the appended claims.

We claim:

1. A generator of energy-depleted radiation, comprising:

at least one conventional source of coherent radiation providing a plurality of at least two coherent beams of energy-bearing radiation; and at least one-beam interaction element, including at least one interaction region into which are input the beams of energy-bearing radiation, and from which are derived a plurality of least two energy-depleted radiation beams having wave properties identical to those of the conventional source of radiation but having substantially reduced energy flux;

wherein the beam interaction element includes means for directing the plurality of at least two coherent beams of energy-bearing radiation along paths that intersect in the interaction region and produce an interference pattern with zones of constructive interference and zones of destructive interference;

and wherein the beam interaction element also includes means for selectively transmitting energy-depleted radiation from a plurality of at least two zones of destructive interference in the interaction region.

2. A generator of energy-depleted radiation as defined in claim 1, wherein:

the means for selectively transmitting energy-depleted radiation includes an array of transmissive apertures positioned in the interaction region, with each aperture in the array being aligned within one of the plurality of zones of destructive interference; and each aperture in the array of apertures transmits intersecting out-of-phase energy-depleted radiation that diverges beyond the aperture into individual spatially separated beams of in-phase energy-depleted radiation.

3. A generator of energy-depleted radiation as defined in claim 1, and further comprising:

a radiation modulator, for selectively modifying a property of the energy-depleted radiation.

4. A generator of energy-depleted radiation as defined in claim 3, wherein the modulator includes means for encoding data onto the energy-depleted radiation.

5. A generator of energy-depleted radiation as defined in claim 3, wherein the modulator includes a specimen on which the energy-depleted radiation impinges.

6. A method for generating energy-depleted radiation, comprising the steps of:

providing a plurality of at least two coherent beams of energy-bearing radiation from a conventional source of coherent radiation;

introducing the plurality of at least two coherent beams of energy-bearing radiation into at least one interaction region; and deriving from the interaction region a plurality of at least two energy-depleted radiation beams having wave properties identical to those of the conventional source of radiation but having substantially reduced energy flux;

wherein the introducing step includes directing the plurality of coherent radiation beams along paths that intersect in the interaction region;

and wherein the deriving step includes producing an interference pattern with a plurality of zones of constructive interference and a plurality of zones of destructive interference, and selectively transmitting energy-depleted radiation from a plurality of at least two zones of destructive interference in the interaction region.

7. A method defined in claim 6, wherein the step of selectively transmitting energy-depleted radiation includes:

positioning an array of transmissive apertures in the interaction region, with each aperture in the array being aligned within one of the plurality of zones of destructive interference; and transmitting through the array of apertures intersecting out-of-phase energy-depleted radiation that diverges beyond the apertures into individual spatially separated beams of in-phase energy-depleted radiation.

8. A method as defined in claim 7, and further comprising the step of:

modulating the energy-depleted radiation.

9. A method as defined in claim 8, wherein the modulating step includes encoding data onto the energy-depleted radiation.

10. A method as defined in claim 8, wherein the modulating step includes directing the energy-depleted radiation onto a specimen, and selectively modifying a property of the energy-depleted radiation by interaction with the specimen.

* * * * *